Dec. 18, 1923.

B. G. WOOD

SIDE CAR BODY

Filed Dec. 8, 1920

INVENTOR

Benjamin Graham Wood

Dec. 18, 1923.

B. G. WOOD

SIDE CAR BODY

Filed Dec. 8, 1920

INVENTOR

Benjamin Graham Wood

Patented Dec. 18, 1923.

1,478,316

UNITED STATES PATENT OFFICE.

BENJAMIN GRAHAM WOOD, OF LONDON, ENGLAND.

SIDE-CAR BODY.

Application filed December 3, 1920. Serial No. 429,143.

*To all whom it may concern:*

Be it known that I, BENJAMIN GRAHAM WOOD, a subject of the King of Great Britain, residing at 92 Hillfield Road, West Hampstead, London, NW., England, have invented certain new and useful Improvements in Side-Car Bodies, of which the following is the specification.

The object of the present invention is to give greater length to the sitting positions of the sidecar occupants than is available with known types of bodies of similar size. Another object is to properly balance the total weight about the sidecar frame and wheel whether one passenger or two are carried.

This invention also provides a comparatively small body which is apparently a single seater but which may be arranged by means of adjustment to accommodate two adult passengers.

To achieve these objects I provide a sidecar body with seats arranged tandem fashion or one behind the other which has an adjustable front seat and a folding rear seat or a novel form of extending rear seat behind the sidecar body when used as a seat, the effect of my construction being to provide an actual extension of the seating space as a portion of the rear seat is carried by the hinged or pivotally extending rear portion.

Extending rear seats with a folding back are known but only as applied to an auxiliary seat situated in a "boot" or locker or like permanent extension behind the sidecar body as used by the front passenger, this arrangement resulting in largely increased length of the sidecar body or alternatively a cramped position for the occupants, particularly the rear passenger.

By my invention a rear seat is provided in the sidecar body without another compartment or like extension of the body, and additional room for the rear passenger is obtained when desired by moving the front seat forwards or by a rearwardly extending rear seat or by the use of both these means together. I may provide means for the support of the said rear seat when extended consisting of a rigid rail secured to the rear seat of the body.

And in order that my invention may be properly understood reference should be made to the accompanying sheets of drawings which illustrate the preferred examples thereof.

Figure 1:
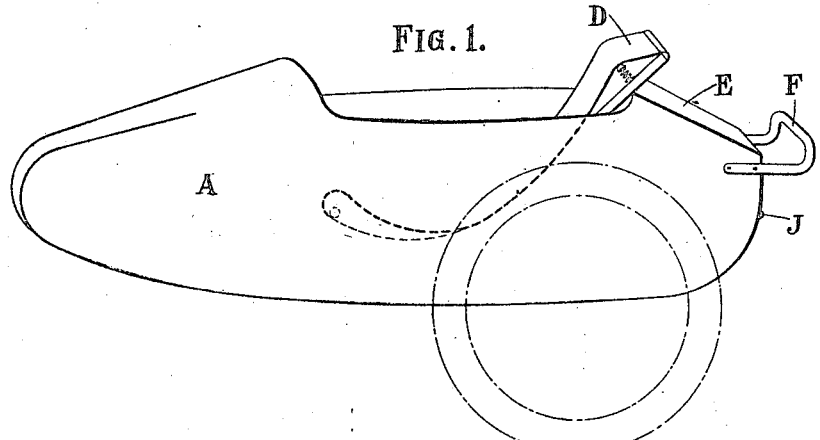
Fig. 1 is a perspective view of a sidecar body with the rear seat closed.

In Fig. 1, the front seat D projects from the sidecar body A and rests at the rear against the back of the second seat E which in the closed condition as shown constitutes a luggage counter. The fixed rail F forms the rear support for the luggage. The upper surface of the luggage counter E is preferably covered with thin sheet rubber.

Figure 2:
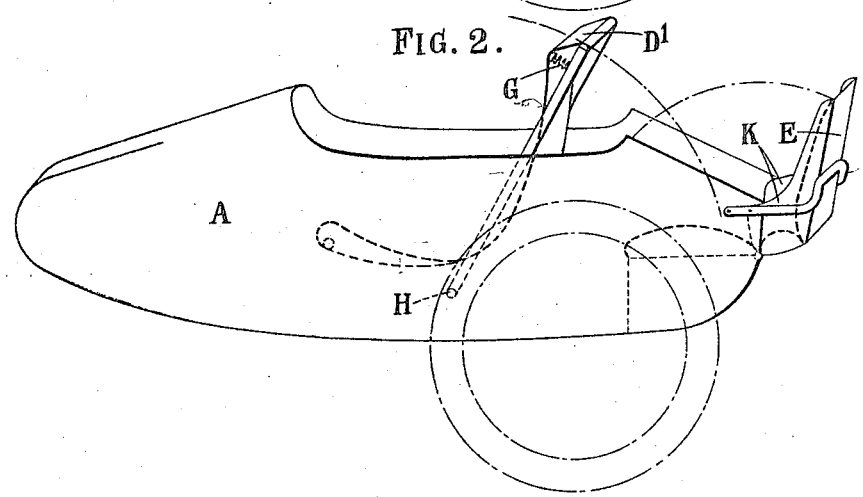
Fig. 2 is a perspective view of the same sidecar shown in Fig. 1 when adjusted as a two seater.

In Fig. 2 the luggage counter E is shown opened backwards about a pivotal centre J some distance below the level of the luggage counter and this causes the pivoted part to be projected some distance behind the sidecar forming an extension of the body and of the rear seat supported by the fixed rail F. The rear seat is thus formed partly inside and partly extended from the sidecar body.

The front seat D in Fig. 1 may be of any description and may be flexible of the hammock type and may be fixed in the position as shown in Fig. 1 but is preferably adjustable in the sidecar body, being moved forwardly to facilitate entry to the rear seat. The position of the sidecar wheel is indicated in Figs. 1 and 2 and by moving the front seat forwards when the rear seat is occupied the weight is more correctly distributed or balanced with respect to the sidecar wheel.

The hinged part of the rear seat has side brackets K which fold within the body when closed and which strengthen the seat and protect the passenger when open.

Figure 3:
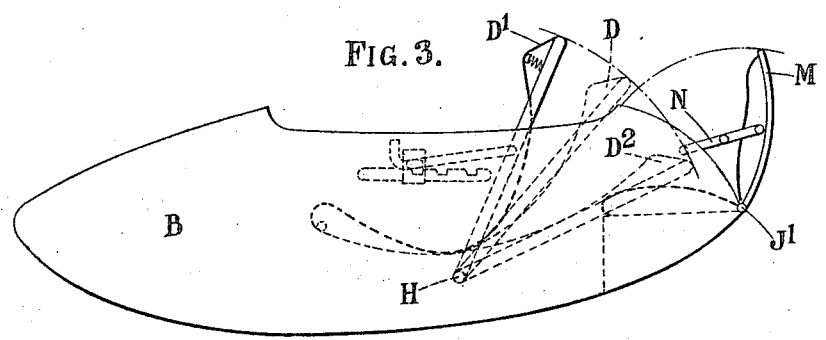
Fig. 3 is a side elevation of another constructional form of sidecar body adjusted as a two seater.

Referring to Fig. 3 which illustrates another form of sidecar body B with an adjustable front seat shown at $D^1$ which is preferably flexible as described in the foregoing example, in this construction a folding rear seat back M is hinged at $J^1$. When the seat back is extended it is supported at either side by hinged tension members or links N of known description. When not required as a two seater the back M may be shut down on the body sides and the front seat D¹ may be moved to positions D or D². With the seat lowered to position D² the whole of the sidecar may be occupied by the front passenger in a reclining position. To make the adjustment of the seat the seat frame member G is moved on pins H about a transverse axis and seat adjusting mechanism at either side of the seat is shown in Fig. 3 and to a larger scale in Fig. 6.

Figure 6:
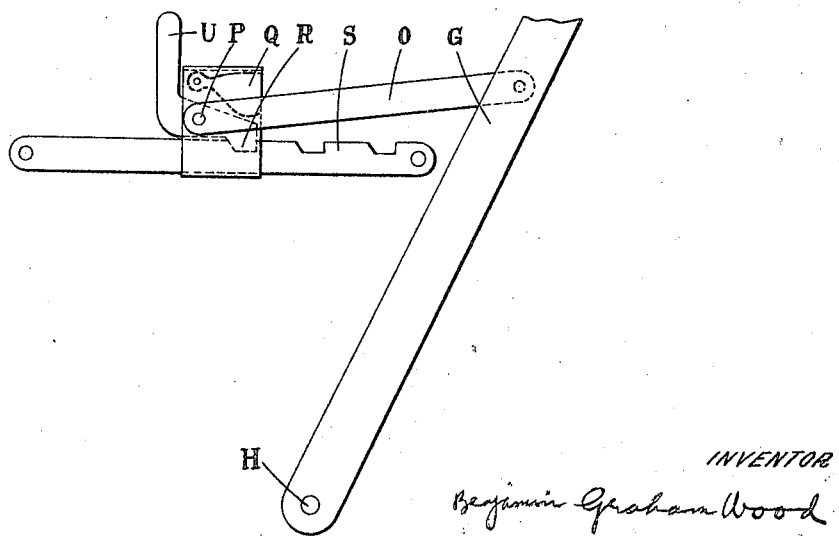
Fig. 6 is a view to a larger scale of the seat adjustment mechanism shown in Fig. 3.

Referring to Fig. 6 the seat frame member G pivoted at H is supported by a link O which is pivoted at one end to the frame member G and at the other end to a pin P mounted in a sliding clip Q which is of rectangular section and carries a pawl R which is held in notches in a rack S by a spring. The pawl may be released by a small handle U which forms a bell crank lever about the pivot P. The front edges of the notches on the rack S are sloping to allow the seat to be raised, manipulation of the lever being required to lower the seat. The links O may be upholstered to form arm rests for the seat.

This seat adjusting mechanism may also be used on the sidecar shown in Figs. 1 and 2 but not shown in these views.

Figure 4:
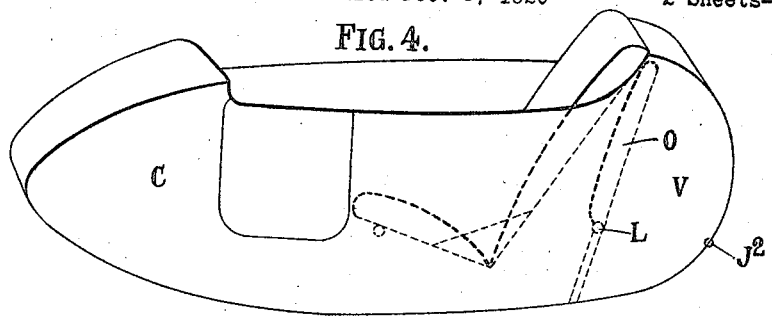
Fig. 4 is a perspective view of another arrangement of sidecar body adjusted as a single seater.
Figure 5:
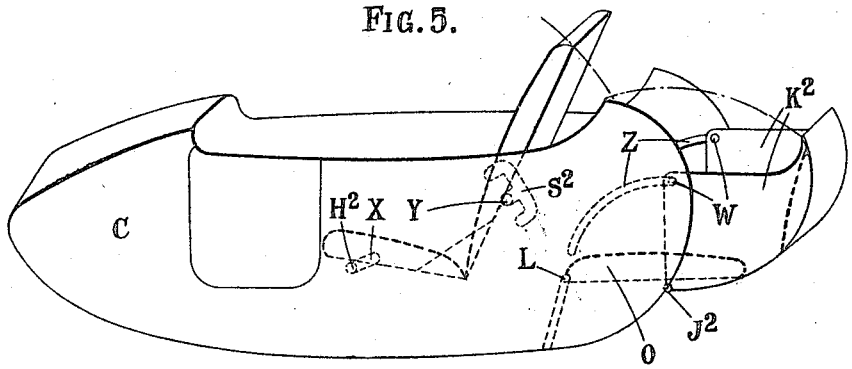
Fig. 5 is a perspective view of the sidecar body shown in Fig. 4 adjusted as a two seater.

Referring to Figs. 4 and 5, a sidecar body with a bulbous or rounded back is shown in Fig. 4. It may be used as a single seater in the closed condition with a locker V behind the seat. The bulbous back is hinged at J² about a transverse axis and may be opened for access to the locker. To adjust as a two seater the front of the locker V which is hinged at a low level at L may be turned backwards to a horizontal position forming a seat partly inside which it will be noted extends from the sidecar body as shown in Fig. 5. The movable portion of the bulbous back has side brackets K² which are fitted with studs W which project laterally into quadrant shaped slots Z fixed in the sidecar body which slots restrict the backward movement and support the seat when the studs reach the rearmost end of the slots Z.

The front seat of the sidecar may be fixed in the position shown in Fig. 4 but is preferably adjustable, being constructed as a separate unit and pivoted about a transverse axis on pins H² which engage in slots X in the sidecar sides. Pins or projections Y provided at each side of the seat back engage racks S² on either side of the interior walls of the body. To raise the seat to a more forward and more upright angle the back of the seat is pulled rearwards and then moved forwards until the projections Y drop into recesses or notches in the racks S² of which three are shown to suit the desired positions.

To lower the seat it is pulled rearwards and allowed to slide backwards to the required recess to obtain the desired seat adjustment.

What I do claim as my invention and desire to secure by Letters Patent is:—

A sidecar body having front and rear seats arranged in tandem, the front seat being of flexible fabric and having a top rail, said front seat being adjustable by swinging the top rail forwardly and rearwardly, and the rear seat being pivoted for swinging movement into open or closed position.

BENJAMIN GRAHAM WOOD.